United States Patent
Karasawa et al.

(10) Patent No.: US 10,134,407 B2
(45) Date of Patent: Nov. 20, 2018

(54) TRANSMISSION METHOD OF SIGNAL USING ACOUSTIC SOUND

(71) Applicant: Masuo Karasawa, Shanghai (CN)

(72) Inventors: Masuo Karasawa, Shanghai (CN); Kotaro Kashiwa, Kawasaki (JP); Tao Lin, Shanghai (CN)

(73) Assignee: Masuo Karasawa, Shanghai (CN)

( * ) Notice: Subject to any disclaimer, the term of this patent is extended or adjusted under 35 U.S.C. 154(b) by 144 days.

(21) Appl. No.: 15/129,295

(22) PCT Filed: Feb. 27, 2015

(86) PCT No.: PCT/JP2015/055822
§ 371 (c)(1),
(2) Date: Sep. 26, 2016

(87) PCT Pub. No.: WO2015/151678
PCT Pub. Date: Oct. 8, 2015

(65) Prior Publication Data
US 2017/0125025 A1    May 4, 2017

(30) Foreign Application Priority Data
Mar. 31, 2014 (JP) ................................. 2014-074180

(51) Int. Cl.
*G10L 19/00* (2013.01)
*G10L 19/02* (2013.01)
(Continued)

(52) U.S. Cl.
CPC .......... *G10L 19/018* (2013.01); *G10L 19/167* (2013.01); *H04B 11/00* (2013.01);
(Continued)

(58) Field of Classification Search
USPC ......................................................... 704/200
See application file for complete search history.

(56) References Cited

U.S. PATENT DOCUMENTS

| 6,947,893 B1 * | 9/2005 | Iwaki ................. G01C 21/3629 701/441 |
| 7,299,189 B1 | 11/2007 | Sato |

(Continued)

FOREIGN PATENT DOCUMENTS

| EP | 1 087 377 A1 | 3/2001 |
| EP | 2 362 383 A1 | 8/2011 |

(Continued)

OTHER PUBLICATIONS

Extended (supplementary) European Search Report dated Jan. 12, 2018, issued in counterpart European Application No. 15772822.1. (21 pages).

(Continued)

*Primary Examiner* — Satwant Singh
(74) *Attorney, Agent, or Firm* — Westerman, Hattori, Daniels & Adrian, LLP

(57) ABSTRACT

To provide a transmission method of an arbitrary signal using an acoustic sound hardly affecting the mood (quality) of the original acoustic sound even if an arbitrary signal within an audible frequency range is combined into the acoustic sound such as music.
The method comprises a step of finding a separable sound, of which a fundamental element (fundamental sound) b2 contributing mainly to recognition of a single sound and an additional element contributing collaterally to recognition of the single sound are separable on temporal axis or frequency axis, among plural sounds composing the acoustic sound, or inserting a separable sound into the plural sounds composing the acoustic sound. The additional element of the separable sound found or inserted is transcribed by a signal pattern b1-1, b1-2 of the arbitrary signal. By means of the acoustic sound of which additional element is transcribed, the arbitrary signal b1-1, b1-2 is transmitted. The additional element may be a sound generated when transmitting vibration (Continued)

| Duration | 4kHz | 8kHz |
|---|---|---|
| 50ms | × | × |
| 25ms | × | × |
| 12ms | × | × |
| 6ms | △ | △ |
| 3ms | △ | ○ |
| 2ms | ○ | ○ |
| 1ms | ○ | ○ |

○ Insensible to human ears as having musical intervals
△ Difficult to be recognized as having musical intervals
× Sensible to human ears as having musical intervals energy to a resonance body (resonant body). The fundamental element may be a sound produced according the own resonance mode (resonant mode) by the resonance body (resonant body) receiving the vibration energy.

8 Claims, 9 Drawing Sheets

(51) Int. Cl.
*G10L 19/018* (2013.01)
*H04B 11/00* (2006.01)
*G10L 19/16* (2013.01)
*G10H 1/12* (2006.01)
*H04H 20/31* (2008.01)

(52) U.S. Cl.
CPC ......... *G10H 1/12* (2013.01); *G10H 2210/031* (2013.01); *G10H 2210/056* (2013.01); *H04H 20/31* (2013.01)

(56) References Cited

U.S. PATENT DOCUMENTS

| | | | | |
|---|---|---|---|---|
| 7,657,435 | B2* | 2/2010 | Iwaki | G01C 21/3629 701/443 |
| 7,949,519 | B2* | 5/2011 | Iwaki | G01C 21/3629 704/205 |
| 8,635,072 | B2* | 1/2014 | Iwaki | G01C 21/3629 375/260 |
| 8,796,527 | B2* | 8/2014 | Okuyama | G10H 1/0041 84/625 |
| 8,958,897 | B2* | 2/2015 | Cleve | H04M 3/002 455/502 |
| 9,318,116 | B2* | 4/2016 | Mangold | G10L 19/018 |
| 9,401,996 | B2* | 7/2016 | Root | H04M 3/002 |
| 2002/0027994 | A1* | 3/2002 | Katayama | G10L 19/018 380/269 |
| 2003/0059082 | A1* | 3/2003 | Suzuki | G11B 20/00086 382/100 |
| 2003/0154379 | A1 | 8/2003 | Kawano | |
| 2003/0172277 | A1* | 9/2003 | Suzuki | G10L 19/018 713/176 |
| 2006/0106597 | A1* | 5/2006 | Stein | G10L 19/20 704/203 |
| 2010/0245581 | A1 | 9/2010 | Koyama et al. | |

FOREIGN PATENT DOCUMENTS

| | | |
|---|---|---|
| JP | 11-219172 A | 8/1999 |
| JP | 2001-282234 A | 10/2001 |
| JP | 2003-233372 A | 8/2003 |
| JP | 2004-62024 A | 2/2004 |
| JP | 2011-530939 A | 12/2011 |
| WO | 00/57399 A1 | 9/2000 |

OTHER PUBLICATIONS

International Search Report dated May 19, 2015, issued in counterpart International Application No. PCT/JP2015/055822 (2 pages).

Li et al., "Robust audio watermarking based on rhythm region detection", Electronics Letters, vol. 41, No. 4, pp. 218-219, Feb. 17, 2005.

Yun et al., "Spectral Magnitude Adjustment for MCLT-Based Acoustic Data Transmission", IEICE Transactions on Information and System, May 1, 2012, vol. E95.D, No. 5, 1523-1526.

Partial supplementary search report dated Sep. 20, 2017, issued in counterpart European Application No. 15772822.1 (17 pages).

\* cited by examiner

| Duration | 4kHz | 8kHz |
|---|---|---|
| 50ms | × | × |
| 25ms | × | × |
| 12ms | × | × |
| 6ms | △ | △ |
| 3ms | △ | ○ |
| 2ms | ○ | ○ |
| 1ms | ○ | ○ |
○ Insensible to human ears as having musical intervals
△ Difficult to be recognized as having musical intervals
× Sensible to human ears as having musical intervals
FIG.1
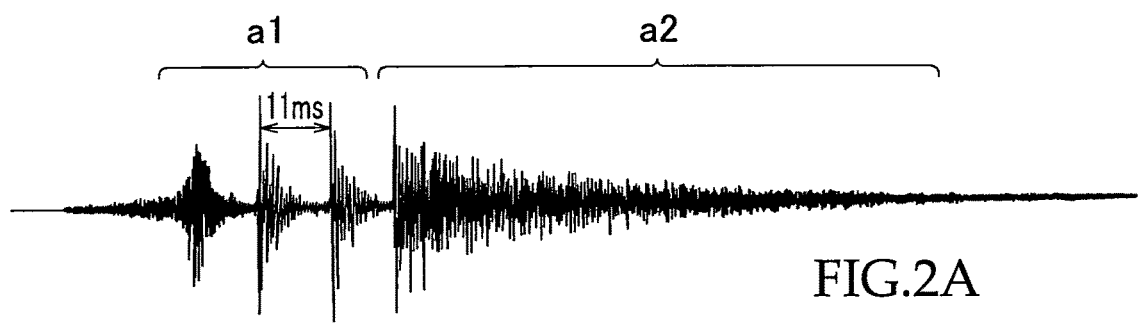
FIG.2A
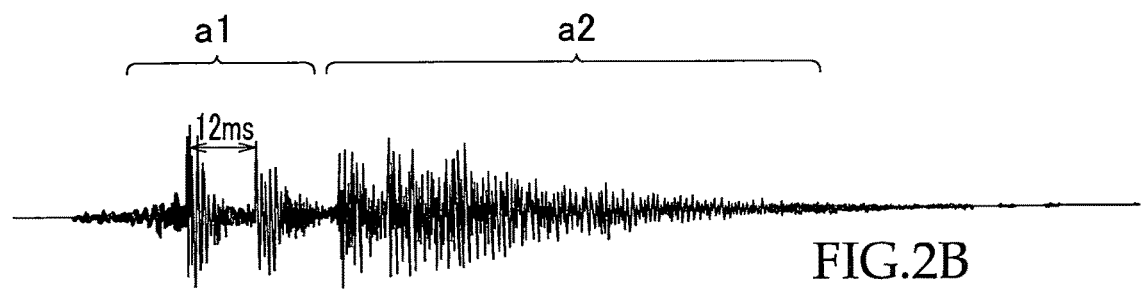
FIG.2B

| First pseudo DaOn (Positive data values) | Second pseudo DaOn (Interpolated values) |
|---|---|
| 0 | 4 |
| 1 | 3 |
| 2 | 2 |
| 3 | 1 |
| 4 | 0 |

| First pseudo DaOn (Positive data values) | Second pseudo DaOn (Interpolated values) |
|---|---|
| ⓪ | 1 through 3 |
| ① | 2 or 4 |
| ② | 3 or 4 |
| 3 or 4 | ② |
| 2 or 4 | ① |
| 1 through 3 | ⓪ |

◯ Values to be preferentially used for judgment

TRANSMISSION METHOD OF SIGNAL USING ACOUSTIC SOUND

FIELD OF THE INVENTION

The present invention relates to a transmission method of an arbitrary signal using an acoustic sound hardly affecting the quality of the original acoustic sound even if an arbitrary signal within an audible frequency range is combined into the acoustic sound such as music.

BACKGROUND

Conventionally, several electronic watermark techniques have been developed for transmitting an arbitrary signal together with an acoustic sound by embedding the arbitrary signal within a frequency range, indistinguishable or nearly indistinguishable to human ears, into the acoustic sound such as music or the like.

PRIOR ART DOCUMENTS

Patent Documents

Patent document 1: JP2011-530939A

SUMMARY OF THE INVENTION

Problem to be Solved by the Invention

However, the method of transmitting an arbitrary signal using an acoustic sound disclosed in the aforementioned prior art has the following problems:
(1) In the case of using an arbitrary signal within a frequency range indistinguishable to human ears, it is possible to transmit the arbitrary signal without affecting the audio quality because nobody can hear the sound. However, in this method, increase in data volume is inevitable because data in such a frequency range are needed besides audio data in an audible frequency range (a frequency range distinguishable to human ears). In addition, dedicated equipment may be manufactured because there are limits on sending and receiving data by using general-purpose audio equipment designed on the assumption of the audible frequency range.
(2) In the case of using an arbitrary signal within a frequency range nearly indistinguishable to human ears, there is a risk of affecting the mood of the original acoustic sound (such as noise, clipping noise, feeling of strangeness in musical scale and the like) because the arbitrary signal is still within an audible frequency range though the frequency of the arbitrary signal is nearly indistinguishable. In addition, there may be limits on time and frequency position for insertion of the arbitrary signal according to the sound pressure level and/or frequency components of the original acoustic sound.

The present invention was made in the light of the above described problems. It is an object of the present invention to provide a transmission method of an arbitrary signal using an acoustic sound hardly affecting the mood (quality) of the original acoustic sound even if an arbitrary signal within an audible frequency range is combined into the acoustic sound such as music or the like.

Means for Solving the Problems

The present invention provides a transmission method of an arbitrary signal using an acoustic sound by embedding an arbitrary signal into the acoustic sound composed of plural sounds and is characterized by comprising steps of: finding a separable sound, of which a fundamental element contributing mainly to recognition of a single sound and an additional element contributing collaterally to recognition of the single sound are separable on temporal axis or frequency axis, among the plural sounds composing the acoustic sound, or inserting a separable sound into the plural sounds composing the acoustic sound, and transcribing the additional element of the separable sound found or inserted in the above by a signal pattern of the arbitrary signal so that the arbitrary signal is transmitted by means of the acoustic sound thus changed.

The additional element contributing collaterally to recognition of the single sound may be a sound generated when transmitting vibration energy to a resonance body (a resonant body). Taking a guitar as an example, the additional element is a sound at the moment when hitting a string by using a plectrum. The sound itself is not a fundamental element of the guitar. In case of a handclap or a drum, the additional element is a sound at the moment when a palm or a drumstick collides with the other palm or the drum. Hereinafter, such sound will be referred to as "DaOn".

On the other hand, an object (the resonance body, i.e. an instrument or palms) receiving vibration energy by means of the DaOn produces sound according its own resonance mode (resonant mode). The sound inherent in the object depends on its own resonance mode (resonant mode) and is the fundamental element contributing mainly to sound recognition.

Through experiments, the inventor(s) of this application found that the fundamental element is a substantive portion in the separable sound which characterizes the sound and that the additional element is recognizable as a portion only influencing the mood of the sound. The inventor(s) also found that when additional element is eliminated from the sound, people can recognize the characteristics of the sound by the fundamental element but also find changes in mood of the sound. Therefore, a signal pattern of an arbitrary signal is combined into the additional element, thereby not only achieving transmission of an arbitrary signal but also making the sound having the mood similar to that of the original sound. That is, the present invention enables an acoustic sound such as music into which an arbitrary signal is combined to be recognized by people as substantially equal to the original acoustic sound including the mood even though the arbitrary signal is within an audible frequency range.

The present invention also provides a transmission method of an arbitrary signal using an acoustic sound as mentioned above, wherein the signal pattern of the arbitrary signal has a time period similar to the time period of the additional element, a frequency component similar to the frequency component of the additional element, or a sound pressure level similar to the sound pressure level of the additional element. According to the present invention, the signal pattern of the arbitrary signal is substantially equal to the signal pattern of the original additional element. Since the effect of improving the mood of the sound by the signal pattern of the arbitrary signal is equal to the effect of improving the mood of the sound by the original additional element, people may recognize the acoustic sound with the arbitrary signal as equal to the original acoustic sound.

The present invention further provides a transmission method of an arbitrary signal using an acoustic sound as mentioned above, wherein the separable sound is one of sounds including handclaps, drum sounds, percussive sounds, cymbal sounds, gongs, horn of an automobile, ringer on a phone, chime, siren, and various effect sounds. Accordingly, any of these sound can be recognized by people as an acoustic sound substantially equal to the original acoustic sound.

Furthermore, the present invention provides a transmission method of an arbitrary signal using an acoustic sound as mentioned above, wherein when the sound has a plurality of the additional elements, one of the additional elements is transcribed by a signal pattern as a positive signal of the arbitrary signal and the other one is transcribed by a signal pattern having a complementary relationship to the positive signal of the arbitrary signal, and if the complementary relationship therebetween is incorrect, the signal patterns are compared at a side receiving the arbitrary signal to employ one of the signal patterns of which S/N ratio is higher. Accordingly, any of the plural additional elements can be effectively used, thereby enabling transmission of an arbitrary signal with higher accuracy.

Moreover, the present invention provides a transmission method of an arbitrary signal using an acoustic sound as mentioned above, wherein sections where temporal masking is effective before and after the fundamental element are assumed as the additional elements, and the additional elements are transcribed by signal patterns of the arbitrary signal. Accordingly, temporal masking can be effectively used to transmit the arbitrary signal.

Effects of the Invention

According to the present invention, even if an arbitrary signal within an audible frequency range is combined into an acoustic sound such as music or the like, the acoustic sound with the arbitrary signal can be recognized by people as substantially equal to the original acoustic sound including its mood (quality).

BRIEF DESCRIPTION OF THE DRAWINGS

FIG. 1 is a diagram showing a result of experimentation for testing whether or not single sounds of 4 kHz and 8 kHz are sensible to human ears as having musical intervals by hearing the single sounds of 4 kHz and 8 kHz of different durations.

FIG. 2A is a waveform chart showing an example of a handclap.

FIG. 2B is a waveform chart showing another example of a handclap.

EMBODIMENTS OF CARRYING OUT THE INVENTION

Figure 3:
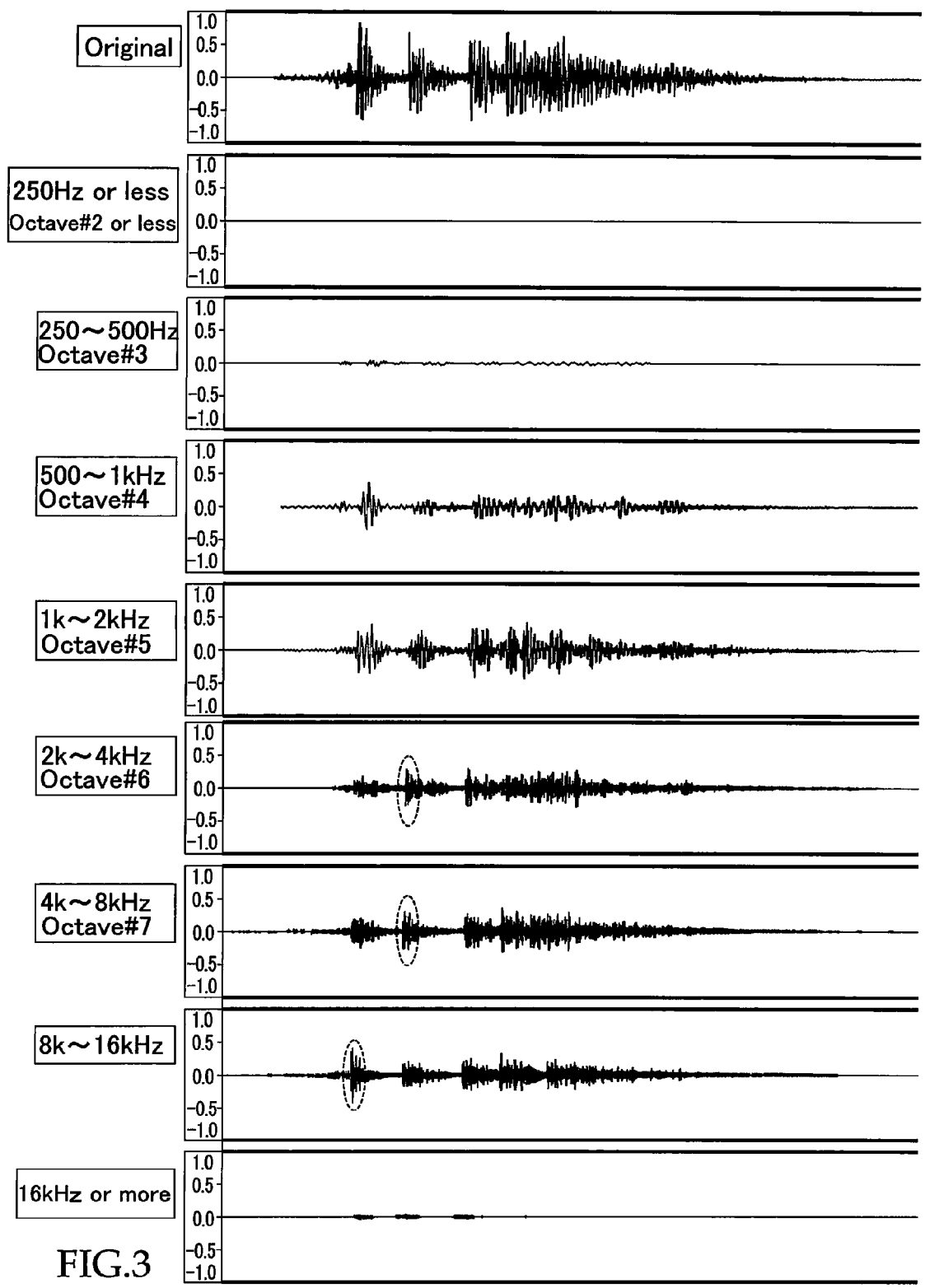
FIG. 3 is a frequency analysis diagram showing the handclap broken down according to frequency bands.

The present invention is aimed to provide a method of embedding an arbitrary signal without causing a feeling of strangeness to an acoustic sound such as music or the like. The phase "embedding an arbitrary signal without causing a feeling of strangeness" means that it not only never changes characteristics of the original sound but also can obtain a mood of sound similar to the mood of the original sound.

First, description will be made with regard to a masking effect for achieving the aforementioned method. Masking effect is a property due to processing in human brain that a human has difficulty in hearing one of a plurality of pure sounds when a certain condition is satisfied. There are two kinds of masking effects. One is simultaneous masking and the other is temporal masking.

The simultaneous masking is a masking phenomenon between two sounds simultaneously produced and is also called frequency masking. For example, though we can discriminate between sounds in sinusoidal frequencies of 440 Hz and 450 Hz if we hear them separately, we cannot clearly discriminate between them if we hear them simultaneously because they have nearly the same frequencies. It should be noted that however, when a difference in frequency between two sounds is several Hz or less, beat phenomenon occurs due to the difference in frequency so that another consideration must be made separately from the masking.

The temporal masking is a phenomenon that when a strong sound suddenly occurs, we cannot hear sounds before and after the strong sound. Masking in which a preceding sound is masked is called backward masking, while masking in which a following sound is masked is called forward masking. When a time span between a masking sound (masker) and a sound to be masked (maskee) is longer, the effect is weaker in an exponential manner. The limit of time span is about 20 milliseconds or less for the backward masking and about 100 milliseconds or less for the forward masking.

Next, description will be made as regard to recognition of musical intervals. Though human ears are sensitive for hearing musical intervals, the sensitivity for musical intervals is decreased in a high-tone range. For example, though sounds produced by rhythm instruments (drums, percussion and the like) have frequencies (musical intervals) obviously, such rhythm instruments have less musical interval elements such as chords according to music theory because their sounds are in high-tone range. That is, human ears can hear sound within a range from about 20 Hz to about 20 kHz, while the limit that human ears can recognize as musical intervals is 4 kHz at the highest. When we hear sounds over 4 kHz, we recognize as having no musical intervals. If, however, a musical performance is maintained for a long duration, the sound within high-tone range of 4 kHz or higher is sensible to human ears as having musical intervals even though it may be fuzzy. That is, there is a limit of duration for keeping sounds insensible to human ears as having musical intervals.

FIG. 1 is a diagram showing a result of experimentation for testing whether or not single sounds (sine waves) of 4 kHz and 8 kHz are sensible to human ears as having musical intervals by hearing the single sounds of 4 kHz and 8 kHz of different durations (50 ms, 25 ms, 12 ms, 6 ms, 3 ms, 2 ms, 1 ms). As shown in this figure, musical intervals of a sound of 4 kHz are insensible for 2 ms or less and musical intervals of a sound of 8 kHz are insensible for 3 ms or less so that these sounds are changed to be sensible like fu (enunciate shortly) of sideband. From this experimentation, a result is obtained that, in the high-tone range, it is difficult to recognize musical intervals of continuous sounds of several milliseconds or less.

Now, description will be made as regard to an example of a handclap (pseudo hand clap) by a human body as a percussion instrument. Originally, handclap is a sound created by rapid impact between two human palms. However, in modern music, handclaps are made by electrically composing waveforms and tuning to make them to be easily handled as instrument. FIGS. 2A and 2B are waveform charts each showing an example of a handclap. As shown in these figures, each handclap includes a long wave profile following two or three wave profiles like impulse responses of about 11-ms cycle. Handclaps of waveforms shown in FIGS. 2A and 2B can be resolved into anterior half and posterior half waveforms. As we actually heard only the anterior half waveform a1, we recognized it as a sound in a high-tone range like ka (enunciate shortly) or like puf (enunciate shortly). This is characteristic sound of percussion instruments (handclaps are sounds by a percussion instrument using a human body too). The characteristic cycles of 11 ms and 12 ms depend on the physical configuration, size, viscosity of human palm skin. Because the duration was several milliseconds, it was difficult to be recognized as a sound having musical intervals as mentioned above. In this specification, hereinafter, the portion of the waveform a1 will be referred to as "DaOn".

On the other hand, as we heard only the posterior half waveform a2 as shown in FIGS. 2A, 2B, we knew it was a principal sound composing the musical interval of the handclap. That is, we found that the posterior half is a dominant sound defining the handclap in which natural frequency of the palm as object is attenuated under resonance condition around the palm. In this specification, hereinafter, the portion of the waveform a2 will be referred to as "fundamental sound".

We compared cases by hearing sounds prepared by eliminating three DaOns within the waveform a1 shown in FIG. 2A one by one in order from earliest to latest. According to this experimentation, the larger in number of the DaOns the handclap includes, the thicker the handclap is (that is, DaOns improve the mood (quality) of the handclap). However, there was little change in the musical interval among the respective handclaps with one, two and three DaOns. This must be due to the effect of the aforementioned temporal masking (especially, the backward masking). Especially the two DaOns within about 20 ms from the fundamental sound are subject to the masking so that these are completely non-dominant undistinguished sounds (but these DaOns make a large contribution to the mood as mentioned above). Further, we compared cases by hearing a sound prepared by damping only the fundamental sound portion of the handclap shown in FIG. 2A into a half level (that is, the amplitude of the portion of the waveform a2 shown in FIG. 2A is damped into one half (−6 dB)) and also hearing the original handclap without damping. We recognized that the loudness of the entire sound was reduced but there is no or little change in the mood between these sounds.

We found that the fundamental sound in the posterior half is dominant to the handclap as a continuous sound and in terms of masking and that the DaOns in the anterior half are recognized as sounds for improving the mood only (hereinafter, referred to as "mood sounds").

Accordingly, the inventor(s) of this application tried to use the posterior half (the fundamental sound) of the handclap as a handclap and to transcribe the anterior half (the DaOns) by a signal pattern of an arbitrary signal. It is preferable that the signal pattern to be embedded has a time period similar to the time period of the original DaOns, a frequency component similar to the frequency component of the original DaOns, and a sound pressure level similar to the sound pressure level of the original DaOns. The arbitrary signal thus has the effect of mood sounds similar to the original mood sounds of DaOns. Therefore, an acoustic sound nearly the same as the original handclap can be obtained.

Now, description will be made as regard to analysis of the handclap. FIG. 3 is a frequency analysis diagram showing the handclap shown in FIG. 2B broken down according to frequency bands. In respective extraction frequency bands, musical intervals between frequency bands (Octave Numbers) are approximated to nice round integers. It should be noted that Octave #3 is a range of cantus (about the middle of a 88-key piano keyboard). As shown in this figure, components of the handclap are dispersed over all of mid- to high-frequency bands. However, we analyzed it with a focus on impulse response-like configuration of the DaOn and thus found that components in portions (three portions) surrounded by dotted lines especially contribute. That is, the middle of the handclap is about 4-8 kHz.

From the results that the middle of the handclap is about 4-8 kHz and that it is difficult to recognize musical intervals of a continuous sound in a frequency band of 4 kHz or more and having a duration of several milliseconds, a single sound (sine wave) of Octave #7 (4-8 kHz) is thought to be suitable as the arbitrary signal to be embedded instead of the handclap (simplification) in view of frequency.

Accordingly, for the frequency of the arbitrary signal used in this embodiment, we selected 4 kHz and 8 kHz as typical frequencies of Octave #7 and also selected 16 kHz. The reason why we selected 4 kHz and 8 kHz is because we considered performance of a bandpass filter for extracting frequencies. Normally, the higher order bandpass filter is more complex and more expensive. To get a rough idea, we assume a secondary filter, easily realized in an analog passive circuit, as a filter of a detection circuit, influence on adjacent single sounds is attenuated about ¼ to ½ (transmission range is changed from single sound to octave) in view of variations of elements because the attenuation rate is 12 dB/octave, thus suppressing waveform distortion to low level. Because of a harmonic sound, the waveform distortion can be simplified (clarified) by phase control, thus facilitating the realization. Though 16 kHz is near an inaudible range, it is a harmonic sound of 8 kHz. In addition, it is a signal having little influence on increase in S/N ratio (Signal to Noise ratio) and its music. These are the reason why we selected 16 kHz.

Figure 4A:
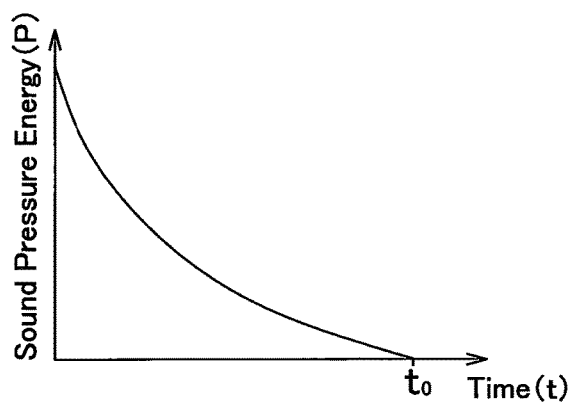
FIG. 4A is a diagram showing an approximate waveform of a single DaOn in the original handclap.
Figure 4B:
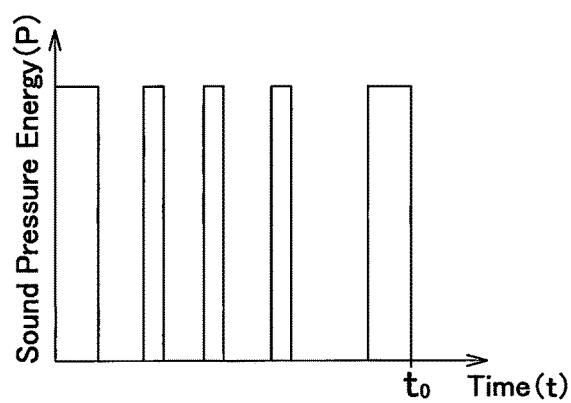
FIG. 4B is a diagram showing an approximate waveform of an arbitrary signal to be embedded instead of the DaOn of FIG. 4A.

FIG. 4A is a diagram showing an approximate waveform (envelope curve) of a single DaOn (one of DaOns in the waveform a1 shown in FIG. 2A or FIG. 2B) in the original handclap. FIG. 4B is a diagram showing an approximate waveform (envelope curve) of an arbitrary signal to be embedded instead of the aforementioned DaOn. It should be noted that both of the waveforms illustrate only plus sides (that is, half wave). Attenuation in the approximate waveform of the DaOn shown in FIG. 4A takes about a half of a cycle (a dozen milliseconds) of the DaOn. On the other hand, as a waveform of an arbitrary signal, a waveform composed of intermittent waves having the same amplitudes and the same configurations is used as shown in FIG. 4B. The waveform of the DaOn shown in FIG. 4A and the waveform of the arbitrary signal shown in FIG. 4B are set to have substantially the same energy integrated value (that is, substantially the same area). The reason why we select the waveform of the arbitrary signal is because if signal transmission is conducted by using an attenuation waveform similar to that of the original DaOn, difficulty is expected to detect the signal by a receiver. Accordingly, a waveform composed of a plurality of simple waves having the same amplitudes is employed as the waveform of the arbitrary signal, thereby facilitating the detection of signal by receiver. Since the DaOn is not recognized as musical intervals as mentioned above, the transcription exercises little influence on the musical intervals of the handclap. On the other hand, the waveform of the original DaOn and the waveform of the arbitrary signal are set to have substantially the same energy integrated value as mentioned above, thereby obtaining nearly the same effect as the mood sound. This means the aforementioned arbitrary signal may be called as a pseudo DaOn.

Figure 5:
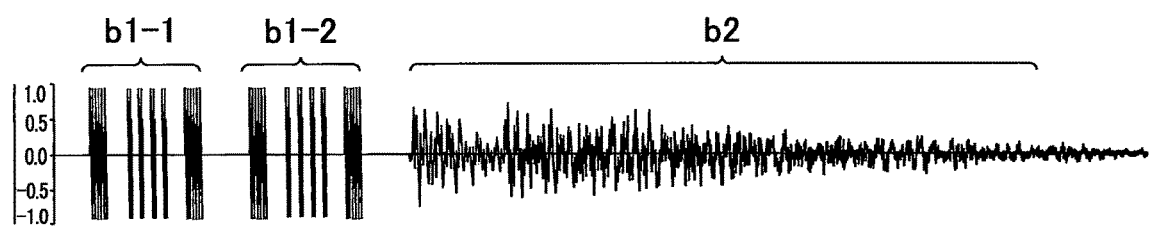
FIG. 5 is a waveform diagram showing an example of handclap into which an arbitrary signal is embedded.
Figure 6:
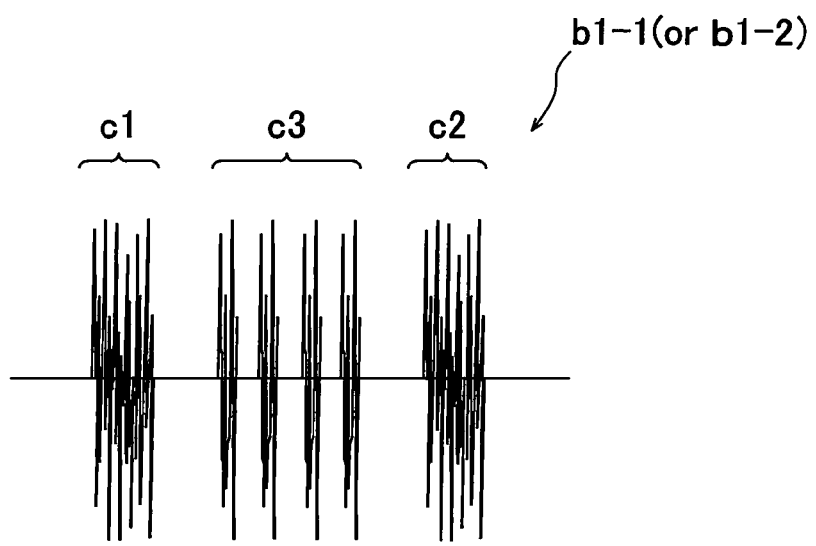
FIG. 6 is a waveform enlarged diagram showing a signal pattern b1-1 of the arbitrary signal.

FIG. 5 is a waveform diagram showing an example of handclap in which arbitrary signals (pseudo DaOns) are embedded instead of original DaOns (early two portions). As shown in this figure, signal patterns b1-1, b1-2 of arbitrary signals are embedded at the early two portions of the waveform, respectively. As a fundamental sound b2 in the posterior half, the same as the original fundamental sound of the handclap is used. FIG. 6 is a waveform enlarged diagram showing one of the signal patterns b1-1 (or b1-2) of the arbitrary signal. As shown in this figure, the signal pattern b1-1 (b1-2) is composed of detection markers (a preamble portion and a postamble portion) c1, c2 arranged at the first and the last, and a data series (a signal series) c3 arranged between the detection markers c1 and c2. The waveform of the arbitrary signal b1-1 (b1-2) is a waveform including all of sin waves of 4 kHz, 8 kHz, 16 kHz having the same amplitudes. Since data transmission is basically completed only by the first signal pattern b1-1, it is expedient to use the second signal pattern b1-2 to compensate (interpolate unique characteristics and/or correct error) the first signal pattern b1-1. Though a variety of methods are conceivable for such compensation, repetition of the same data series c3 is employed in this embodiment. As will be mentioned below, if interpolations data (0 for 4, 1 for 3 and the like) are contained in the second signal pattern b1-2 for compensation of detection accuracy, it operates in favor of the S/N ratio.

Figure 7:
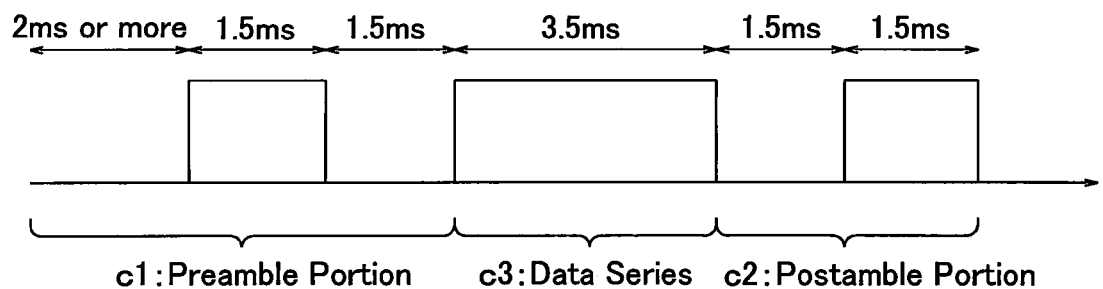
FIG. 7 is a diagram schematically showing the arbitrary signal b1 shown in FIG. 5.

FIG. 7 is a diagram schematically showing one of the arbitrary signals (the pseudo DaOns) b1-1 (b1-2) shown in FIG. 5. As shown in this figure, the preamble portion c1 representing the start of the data of the arbitrary signal b1-1 (b1-2) is composed of a negation section of 2 ms or more and, after that, an assertion section of 1.5 ms followed by a negation section of 1.5m. The postamble portion c2 representing the end of the data is composed of negation section of 1.5 ms and an assertion section of 1.5 ms. After the sound is received by the receiver, the arbitrary signal b1-1 (b1-2) is subjected to envelope detection (full-wave rectification) after passing through the bandpass filter of respective frequencies (4 kHz, 8 kHz, 16 kHz). Further, it is passed through a low-pass filter of about 2 kHz (−12 dB/Oct).

Figure 8:
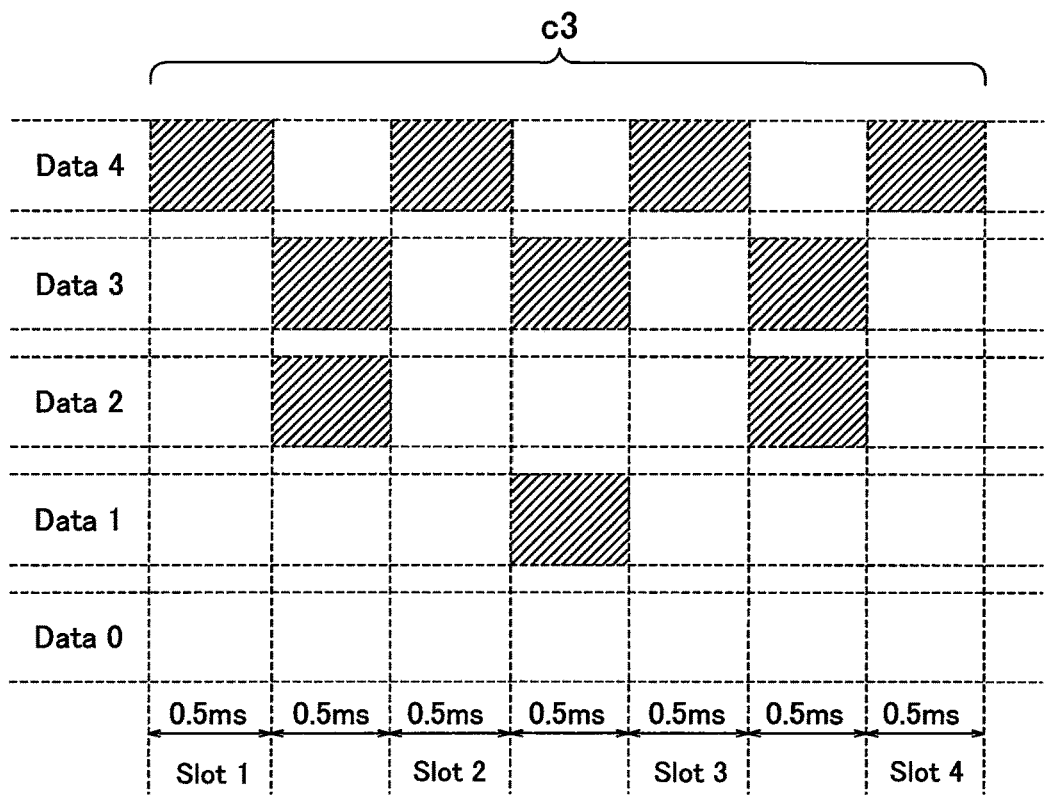
FIG. 8 is a diagram schematically showing an example of data content of a data series c3.

FIG. 8 is a diagram schematically showing an example of data content of the data series c3 shown in FIG. 5 and FIG. 7. The data series c3 is of a count-data type so that its data content depends on the number of assertion sections in the series. As shown in FIG. 8, this method limits data transmission in 5 ways, but it is extremely effective for S/N ratio because of no need to detect locations of bits. It should be noted that both of the arbitrary signals b1-1, b1-2 shown in FIG. 5 are set to Data 4 shown in FIG. 8.

Figure 9:
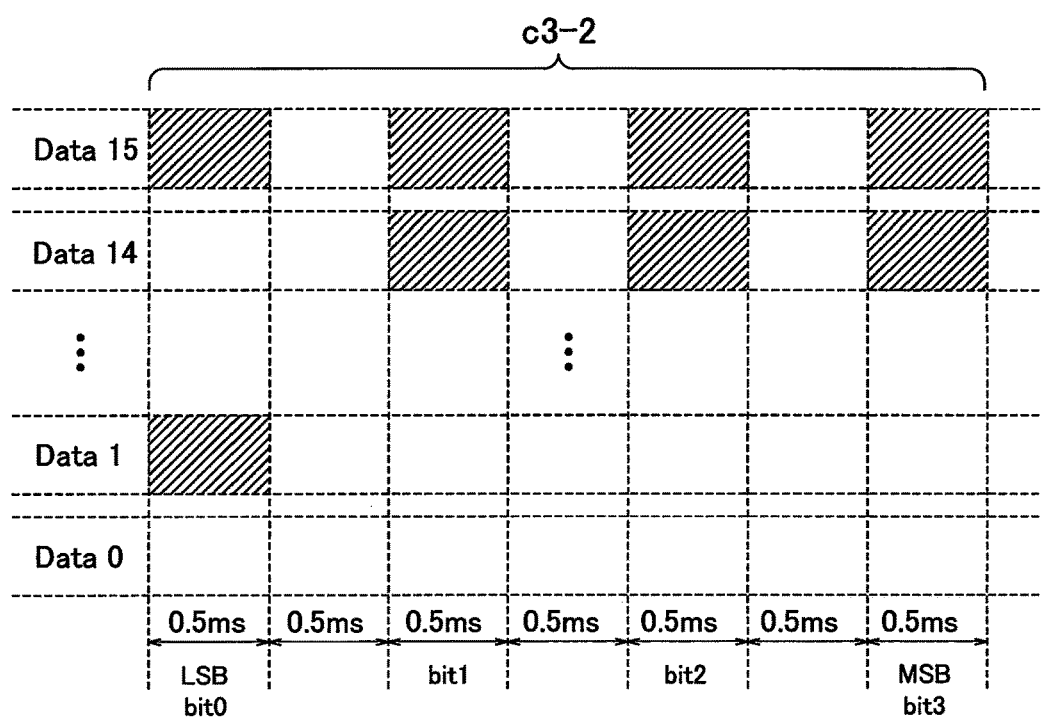
FIG. 9 is a diagram showing another data series c3-2.
Figure 10:
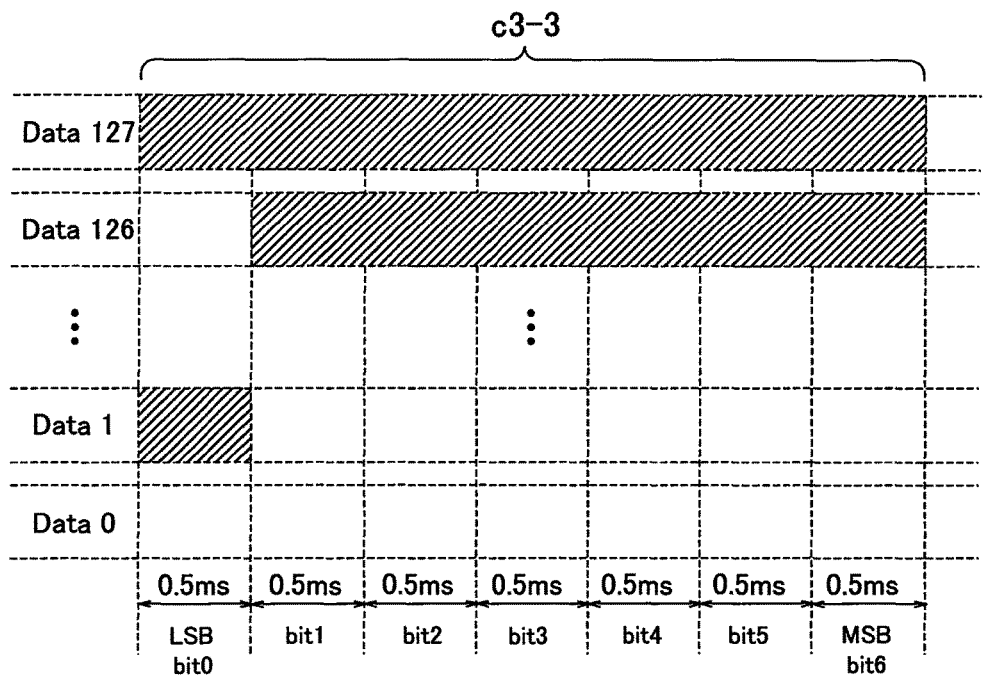
FIG. 10 is a diagram showing another data series c3-3.

FIG. 9 and FIG. 10 are diagrams showing other data series c3-2, c3-3. The data series shown in FIG. 9 is of a normal digital bit (4 bit) type. Though this type allows data transmission in 16 ways, it needs to detect locations of bits. The data series shown in FIG. 10 is of a digital bit (7 bit) type without negation between bits. Though this type allows data transmission in 128 ways, it needs to detect locations of bits with considerable accuracy.

Figure 11:
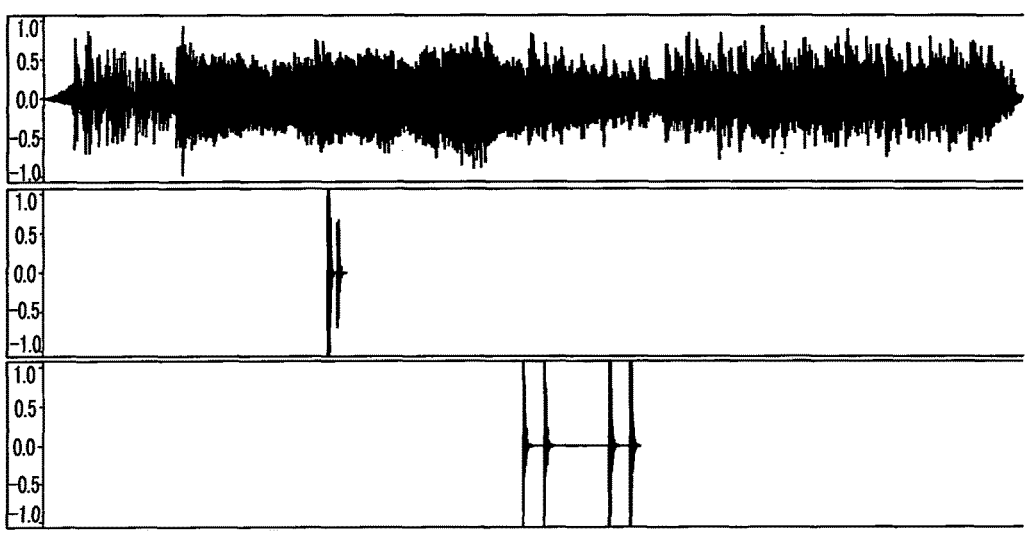
FIG. 11 is a diagram showing a waveform chart of a section of music and waveform charts of handclaps embedded into the aforementioned waveform chart.

A waveform chart shown in an upper portion of FIG. 11 is a waveform chart of a section of music and includes a plurality of handclaps according to the present invention. That is, the waveform chart includes a waveform of a double handclap (chacha) as shown in a middle portion of FIG. 11 and a waveform of four single handclaps (cha) as shown in a lower portion of FIG. 11. If the original music does not contain handclaps, handclaps should be newly embedded into the music. On the other hand, if the original music contains handclaps, the handclaps should be transcribed by handclaps as shown in FIG. 5, thus maintaining the original music. Since the DaOns in the respective handclaps are transcribed by the arbitrary signals, the arbitrary signals may be used by a receiver extracting them. For example, if the music is received by a cell-phone, it is possible to turn on LEDs of the cell-phone according to the handclaps, and so on.

By the way, separable sounds each of which is separable into a fundamental sound (fundamental element) contributing mainly to recognition of the sound and DaOns (additional element) contributing collaterally to recognition of the sound are not only the aforementioned handclaps but also sounds by other various rhythm section instruments. That is, such sounds by rhythm section instruments each contain a fundamental sound and DaOns. Among such sounds by rhythm section instruments, some are sounds of which fundamental sound and DaOns are separable on the temporal axis just like the aforementioned handclaps, while some are sounds of which fundamental sound and DaOns are separable on the frequency axis. The sounds of which fundamental sound and DaOns are separable on the temporal axis are sounds in which the fundamental sound and the DaOns exist at different positions on the temporal axis just like the aforementioned handclaps. The sounds of which fundamental sound and DaOns are separable on the frequency axis are sounds in which frequencies of the fundamental sound and the DaOns are different so that the fundamental sound and the DaOns can be separated according to their frequencies. Especially, it is effective to separate sounds according to frequencies if the fundamental sound and the DaOns are temporally superposed on the other. However, the frequency-based separation is also adapted to cases in which those sounds are not superposed. In case of sounds separable according to the frequencies, DaOns of frequencies different from that of the fundamental sound may be transcribed by arbitrary signals.

The present invention can be also adapted to acoustic sounds of which fundamental element and additional elements are separable on the temporal axis or the frequency axis even though the acoustic sounds are not sounds by rhythm section instruments.

In the aforementioned embodiment using the handclaps, a signal pattern having a time period similar to the time period of the additional element, a frequency component similar to the frequency component of the additional element, and a sound pressure level similar to the sound pressure level of the additional element is used as the signal pattern of the arbitrary signal. That is, the signal pattern satisfies all of the aforementioned three conditions. Therefore, the acoustic sound in which the arbitrary signal is embedded can be made to be substantially equal to the original acoustic sound in view of not only its musical intervals but also its mood. However, even if the signal pattern of the arbitrary signal satisfies only one of the above three conditions, it still has an effect of approximating it to the original acoustic sound.

[Detection of Embedded Sound]

Figure 12:
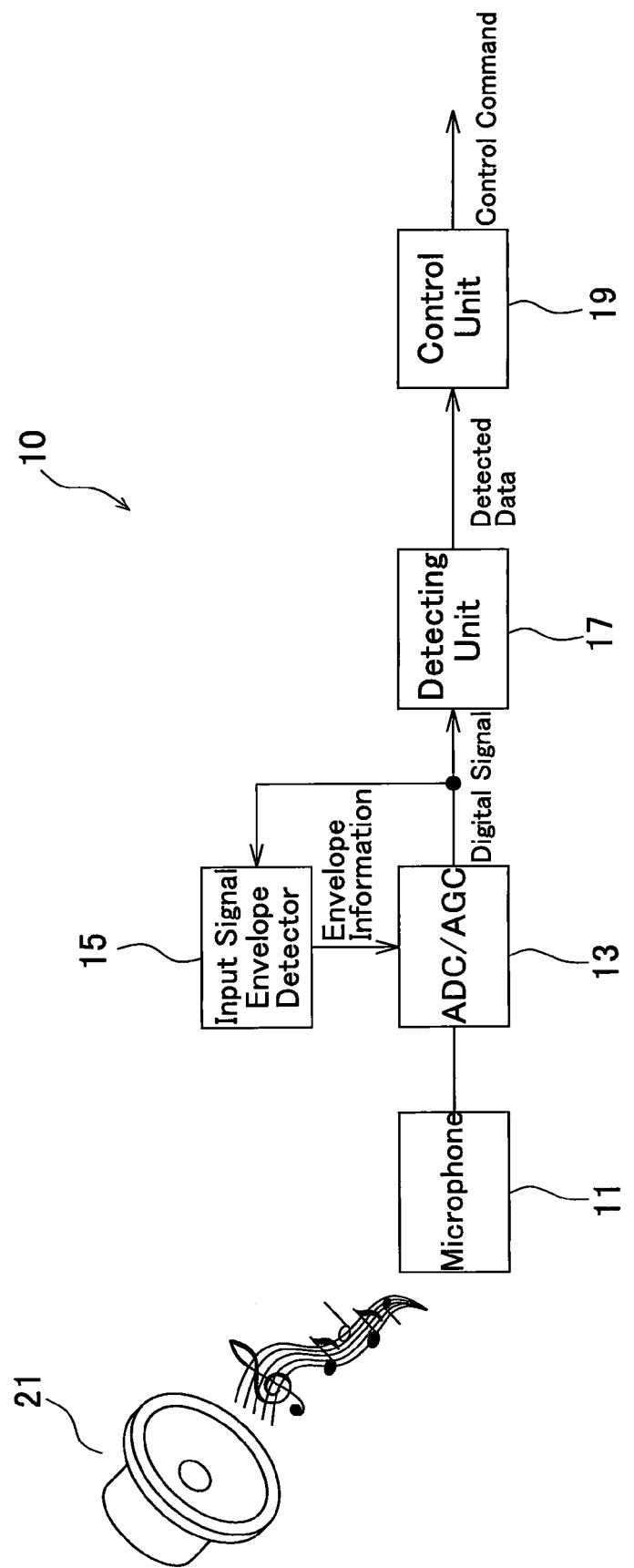
FIG. 12 is a block diagram showing a system construction of a detection device 10 for retrieving an arbitrary signal from an acoustic sound into which the arbitrary signal is embedded.

FIG. 12 is a block diagram showing a system construction of a detection device 10 for retrieving an arbitrary signal from an acoustic sound in which the arbitrary signal is embedded. As shown in this figure, the detection device 10 comprises a microphone 11, ADC/AGC 13, an input signal envelope detector 15, a detecting unit 17, and a control unit 19.

The ADC is an abbreviation of Analogue/Digital Converter, and the AGC is an abbreviation of Automatic Gain Controller. An analog acoustic signal inputted through a microphone 11 from a speaker 21 is sampled by the ADC and converted into digital data. On the other hand, the AGC controls gain to have reference voltage equal to that of a temporally integrated DC signal inputted from the input signal envelope detector 15.

Figure 13:
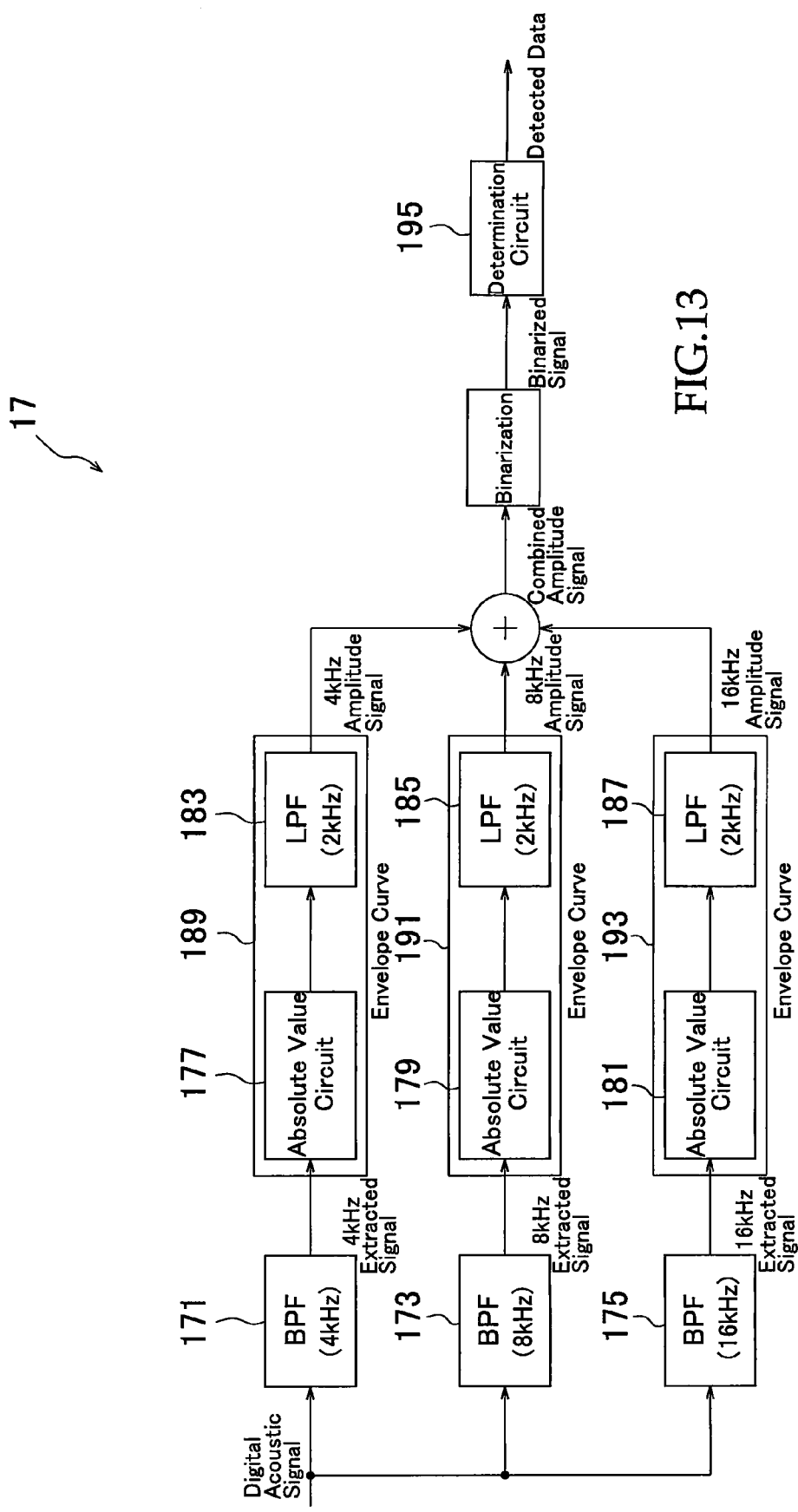
FIG. 13 is a block diagram of a detecting unit 17.

FIG. 13 is a block diagram of the detecting unit 17. As shown in this figure, a digital acoustic signal inputted through the ADC/AGC 13 is filtered by three band-pass filters 171, 173, 175 so as to extract a 4 kHz extracted signal, a 8 kHz extracted signal, and a 16 kHz extracted signal. These extracted signals are converted into a 4 kHz amplitude signal, a 8 kHz amplitude signal, and a 16 kHz amplitude signal composed of envelope curves of amplitudes of the extracted signals, respectively by the envelope detectors 189, 191, 193 composed of absolute value circuits 177, 179, 181 and low-pass filters 183, 185, 187. These amplitude signals are combined. The combined amplitude signal thus made is binarized. The binarized signal thus made is inputted into a determination circuit 195. In the determination circuit 195, accuracy of detection maker and data series of the binarized signal is confirmed, thereby outputting final detected data.

Figures 14, 15, 16:
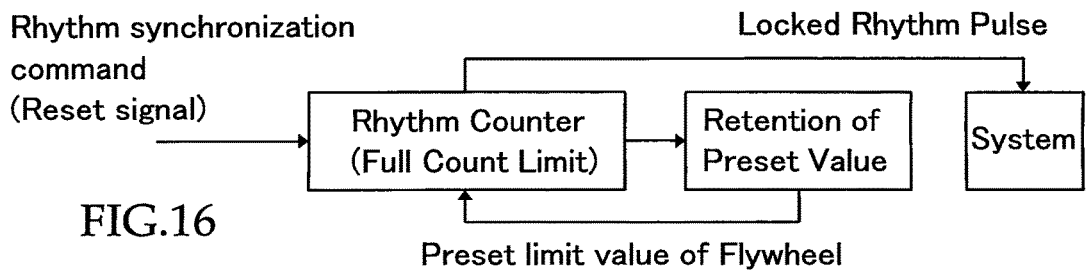
FIG. 14 is a diagram showing an example in which the first signal series are positive data values and the second signal series are values interpolating the positive data values.
FIG. 15 is a diagram showing a way of determination in case that interpolation correlation between the positive data values and the interpolating values is incorrect.
FIG. 16 is a schematic block diagram showing an example of a rhythm synchronization system.

The signal patterns b1-1, b1-2 of first and second pseudo DaOns shown in FIG. 5 are set to be equal. That is, as shown in FIG. 6, values of the first and second data series c3 are "4" if the data series c3 is of a data count type. On the other hand, embedding interpolating values is effective for S/N ratio rather than embedding the same values in a row as shown in FIG. 5. FIG. 14 is a diagram showing an example in which the data series of the first pseudo DaOn are positive data values and the data series of the second pseudo DaOn are values interpolating the positive data values (making 4 by adding together). The reason why this is effective for S/N ratio is because it is possible to make detecting position clearer by setting a negation section wider when the value of the data series is a small number, thereby increasing the accuracy of data. Therefore, as shown in FIG. 15, in case that interpolation correlation between the positive data values and the interpolated values is incorrect, it is possible to improve the accuracy of data by giving priority data of which value is a smaller number.

Returning to FIG. 12, the detected data outputted from the detecting unit 17 is inputted into the control unit 19 where various controls are conducted. The control unit 19 is a unit of plural applications so that a variety of controls may be conducted. Now, description will be made as regard to a rhythm synchronization control as one of the controls.

When a receiver receives an arbitrary signal in music and tries to do something regarding to the music, it is essential for the receiver to extract rhythm of the music. In case of trying to turn on LEDs of a cell phone of the receiver according to the rhythm of the music, for example, it must hit the wrong note if timing of turning on LEDs is far removed from the rhythm of the music.

FIG. 16 is a schematic block diagram showing an example of a rhythm synchronization system. As shown in this figure, in this example, rhythm synchronization is conducted when a certain data in arbitrary signals detected from the music is received. A rhythm counter is a counter having a full count limit. The rhythm counter 50 resets its counter when receiving the certain data as a command for rhythm synchronization (reset signal). The rhythm counter stores a value of the command for rhythm synchronization as a preset value when the count value does not reach a full count value, thereby making a flywheel function. Therefore, it needs to send signals twice in a row at the timing required for the rhythm synchronization. If there is room in number of transmission data, a complex operation such as syncopation may be achieved. That is, in case of eighth note syncopation, even if a command for rhythm synchronization is received at the timing of syncopation, the count value is returned back in time for eighth note so that the top position of a bar can be defined.

Though embodiments of the present invention have been described, the present invention is not limited to the aforementioned embodiments. Various modifications may be made within the technical scope described in the claims, the specification, and the drawings. Any configurations exhibiting the functions and effects of the present invention may be within the technical scope of the present invention, even if these are not directly described in the specification and/or the drawings. For example, though music is used as the acoustic sound in which the arbitrary signal are embedded in the aforementioned embodiments, the present invention may be adapted in the same way to other various sounds (such as horn of an automobile, ringer on a phone, chime, siren, various effect sounds and so on).

EXPLANATION OF REFERENCES a1 waveform (DaOn)
a2 waveform (fundamental sound)
b1-1 signal pattern
b1-2 signal pattern
b2 fundamental sound (fundamental element)
c1 preamble portion (detection marker)
c2 postamble portion (detection marker)
c3 data series (signal series)

c3-2, c3-3 data series
10 detection device
11 microphone
13 ADC/AGC
15 input signal envelope detector
17 detecting unit
171, 173, 175 bandpass filter
177, 179, 181 absolute value circuit
183, 185, 187 low-pass filter
189, 191, 193 envelope detector
195 determination circuit
19 control unit

What is claimed is:

1. A transmission method of a signal using an acoustic sound by embedding the signal into the acoustic sound having plural sounds, comprising steps of:
finding a separable sound, of which a fundamental element contributing mainly to recognition of a single sound and an additional element contributing collaterally to recognition of the single sound are separable on a temporal axis or a frequency axis, among the plural sounds of the acoustic sound, or inserting the separable sound into the plural sounds of the acoustic sound, and
transcribing the additional element of the separable sound found or inserted by a signal pattern of the signal.

2. The transmission method of the signal using the acoustic sound as claimed in claim 1, wherein
the signal pattern of the signal has at least one of a time period similar to the time period of the additional element, a frequency component similar to the frequency component of the additional element, and a sound pressure level similar to the sound pressure level of the additional element.

3. The transmission method of the signal using the acoustic sound as claimed in claim 1, wherein
the separable sound is at least one of sounds including handclaps, drum sounds, percussive sounds, cymbal sounds, gongs, horn of an automobile, ringer on a phone, chime, siren, and various effect sounds.

4. The transmission method of the signal using the acoustic sound as claimed in claim 1, wherein
when the separable sound has a plurality of the additional elements, one of the additional elements is transcribed by the signal pattern of the signal as a positive signal and another one of the additional elements is transcribed by a signal pattern having a complementary relationship to the positive signal, and
if the complementary relationship there between is incorrect, the signal patterns are compared at a side receiving the signal to employ one of the signal patterns of which S/N ratio is higher.

5. The transmission method of the signal using the acoustic sound as claimed in claim 1, wherein
the separable sound has a plurality of the additional elements,
sections where temporal masking is effective before and after the fundamental element are the additional elements, and
the additional elements are transcribed by signal patterns of the signal.

6. The transmission method of the signal using the acoustic sound as claimed in claim 1, wherein
the separable sound has a plurality of the additional elements,
sections where temporal masking is effective before or after the fundamental element are the additional elements, and
the additional elements are transcribed by signal patterns of the signal.

7. The transmission method of the signal using the acoustic sound as claimed in claim 1, wherein
a section where temporal masking is effective before and after the fundamental element is the additional element, and
the additional elements are transcribed by signal patterns of the signal.

8. The transmission method of the signal using the acoustic sound as claimed in claim 1, wherein
a section where temporal masking is effective before or after the fundamental element is the additional element, and
the additional element is transcribed by signal patterns of the signal.

* * * * *